INVENTOR
VOLNEY A. HUTCHINSON
BY
ATTORNEY

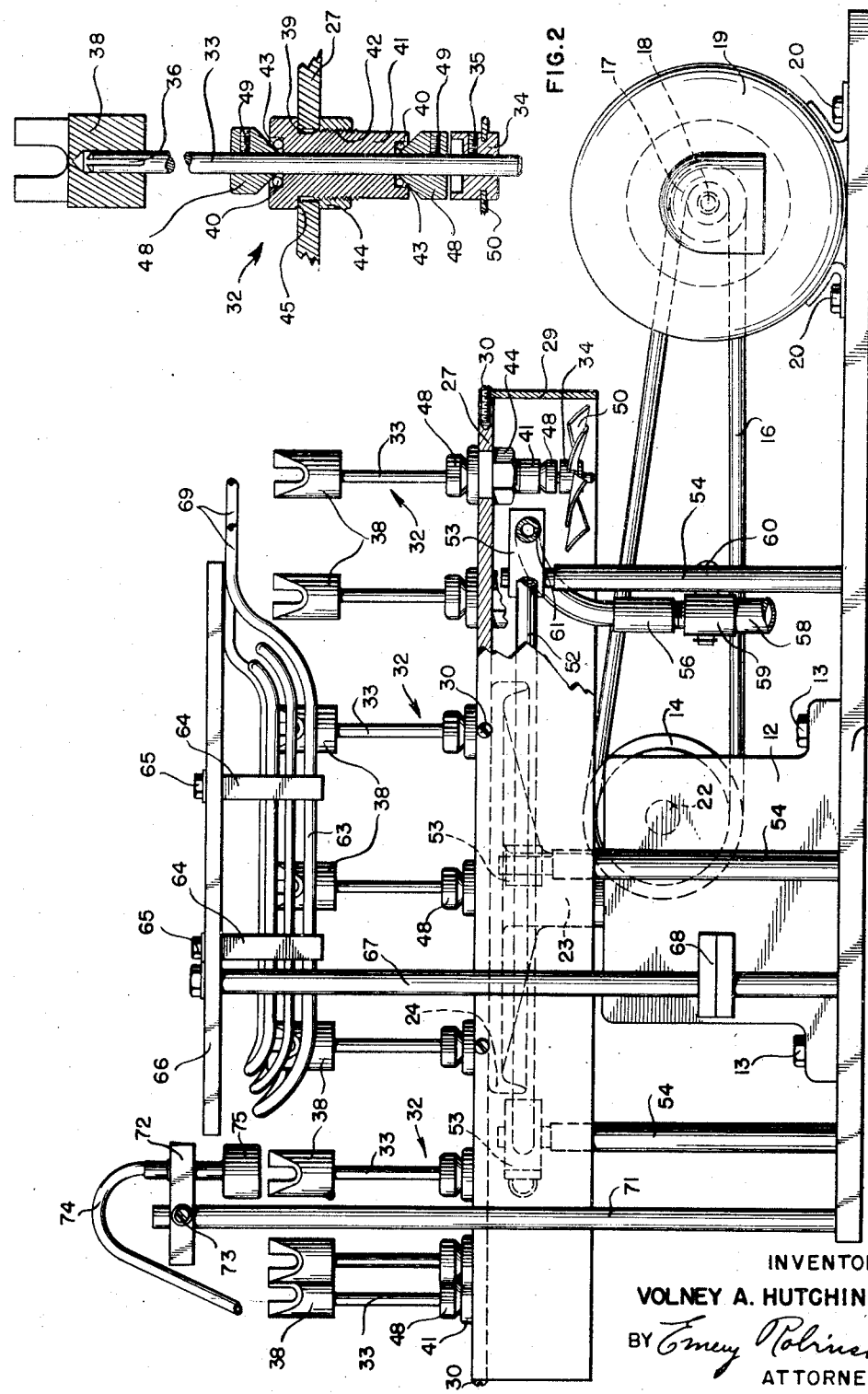

Patented June 17, 1947

2,422,417

UNITED STATES PATENT OFFICE 2,422,417

INDUCTION HEATING APPARATUS WITH ROTATABLE WORK CONVEYOR

Volney A. Hutchinson, Chicago, Ill., assignor to Teletype Corporation, Chicago, Ill., a corporation of Delaware Application November 4, 1944, Serial No. 561,906

2 Claims. (Cl. 219—13)

1

The present invention relates to heating apparatus and more particularly to induction heating apparatus.

The application or the use of high frequency induction heating coils through which are successively passed a plurality of articles to be heated is not new. However, in certain operations, or to achieve certain purposes, it is desirable not only to pass the articles through the heating coil by means of a rotary conveyor but also to individually rotate each of the articles as it passes through the coil. Such latter operation is especially desirable in order that there be uniform and equal heating of the object, and secondly, if such heating is utilized for soldering purposes the solder will be evenly distributed by centrifugal force through the rotation of the article.

Accordingly, it is the principal object of this invention to provide conveyor apparatus associated with an induction heating coil.

A further object of the invention is to provide conveyor apparatus wherein the articles to be heated are not only passed successively through the heating coil but are also rotated individually with respect to the heating apparatus and conveyor during such time as they are passing through the coil.

A still further object of the invention is to achieve individual rotation of the article by means of air pressure.

The features and advantages of the invention will become apparent from the following detailed description of a specific embodiment thereof, when read in conjunction with the accompanying drawings, in which, Fig. 1 is a side elevational view, partly broken away, showing the apparatus embodying the invention;

Fig. 2 is an enlarged detailed view in section showing an individual article holding spindle;

By referring to Fig. 1 it may be seen that the apparatus comprises a base 11 to which is bolted a standard gear reduction mechanism 12 by means of bolts 13. The gear reduction mecha-

Figure 3:
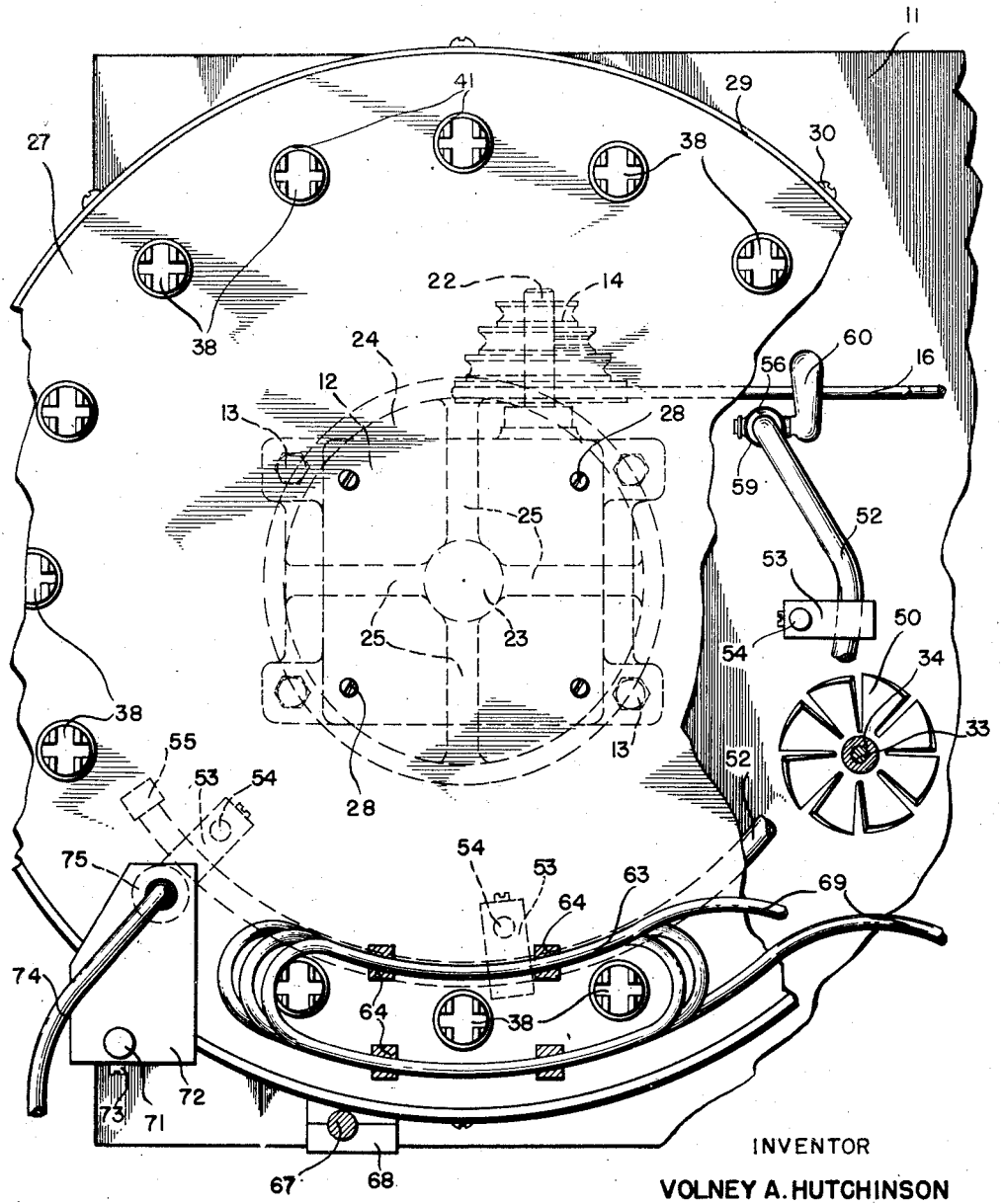
Fig. 3 is a plan view, partly broken away, of the apparatus shown in Fig. 1.

2 nism 12 is provided with a four step cone pulley 14, the steps of which may be more clearly seen in Fig. 3, and through which rotation is imparted to the gear reduction mechanism 12 by means of a belt 16 which passes over a similar pulley 17 fastened at the end of a shaft 18 of a motor 19. The motor 19 is bolted firmly to the base 11 by means of bolts 20. The four step cone pulley 14 has been provided so that by changing the position of the belt 16 with respect to the individual pulley grooves or steps, and by doing likewise with respect to the pulley 17 (the steps of which are not shown) connected to the motor shaft 18, the rotational speed which will be imparted from the motor 19 to the shaft 22 by means of which the cone pulley 14 is connected to the gear reduction mechanism 12 may be varied.

The gear reduction mechanism 12, as mentioned above, translates rotation from the cone pulley 14 and the shaft 22 to a shaft 23 extending upwardly therefrom which is formed at its upper end in a circular plate 24 which may be seen more clearly in Fig. 3, having reinforcing ribs 25 integral therewith. Thus, it may be seen that rotation is imparted to the circular plate 24 from the motor 19 through the driving belt 16, the pulleys 14 and 17, and the gear reduction mechanism 12.

A turret 27 is connected to the smaller circular plate 24 by means of screws 28, as may be seen in Fig. 3, and therefore rotates therewith under power derived from the motor 19. A circular downwardly extending apron 29 is fastened to the periphery of the turret 27 by means of screws 30 and acts as a protection for the operator from the various operating mechanisms under the turret 27.

Secured to the turret 27 toward the periphery thereof and extending therethrough are a plurality of spindle units indicated generally by the numeral 32. As may be seen in Fig. 1, the spindle units 32 are fastened to the turret 27 and extend both upwardly and downwardly therefrom. Referring to Fig. 2, where the spindle units are shown in detail, it may be seen that they are formed of a rod 33 having a collar 34 secured to the lower end thereof by means of a set screw 35. The rods 33 have a slotted opening 36 at the upper end thereof which is utilized to facilitate the engagement of an article holding member 38 thereon.

The turret 27 has a plurality of circular openings 39 therein through which the spindle unit 32 is designed to enter. As may be seen in Fig. 2, a collar 41 is placed within the opening 39, the collar having a threaded section 42 thereon and a pair of ball races 43 at either end thereof. The collar 41 is, as previously mentioned, passed through the circular opening 39 in the turret 27 and a nut 44 screwed on the threaded section 42 which extends below the turret 27, thereby fastening securely the collar 41 with respect to the turret, inasmuch as the collar 41 has a shouldered portion 45 which rests on the top of the turret 27 and thus prevents the collar from passing through the opening 39. A pair of thrust bearings 48 are secured to the rod 33 by means of set screws 49 associated with each thrust bearing. The thrust bearings 48 cooperate with collar 41 to form a pair of ball races 43 which accommodate ball bearings 40 which hold the rod 33 in place with respect to the turret 27 and prevent any vertical movement thereof. As previously mentioned, a collar 34 is secured to the bottom of the rod 33 by means of a set screw 35 and has an eight bladed fan 50, more clearly seen in Figs. 1 and 3, fastened securely thereto.

A semi-circular metallic pipe 52 is provided just below the turret 27, and as may be seen in Fig. 3, extends approximately 180° with respect to the periphery of the turret. The pipe 52 is fastened in place by means of three brackets 53 which are in turn fastened securely toward the upper end of three rods 54 extending upwardly from the base 11 in which they are mounted. It is obvious that the number of brackets is dependent upon securely holding the pipe 52 in position and may be more or less than three. The pipe 52 terminates at one end in a cap 55, as may be seen in Fig. 3, and at the opposite end (Fig. 1) is connected by means of a coupling 56 to a pipe 58 extending to an outward source (not shown) from which air under pressure is supplied. A valve 59, having a handle 60, is provided at the coupling juncture so that the entrance of air under pressure into the pipe 52 may be regulated or shut off. The air pipe 52 has a plurality of small spaced openings 61 in its underside, only one of which is shown (Fig. 1).

An induction heating coil 63 is provided which is arcuate and so positioned that it is near the periphery of the turret 27, overlying the article holders 38. As may be seen in Figs. 1 and 3, the coil 63 is so positioned that the spindles 32 may pass successively through the coil as the turret 27 is rotated. The induction heating coil 63 is formed of metal tubing, preferably copper, bent in a configuration as shown in the drawings and having the forward and rearward ends thereof raised with respect to the parallel sides of the coil so that the articles may pass therethrough. The coil 63 is held in position by means of four supports 64 which in turn are secured by means of bolts 65 to a supporting member 66, which is connected to the base 11 by means of a rod 67, and which has an adjusting member 68 therein so that if a different vertically sized coil might be utilized, the support 66 may be raised or lowered so as to correctly position the coil 63 with respect to the article holders 38 passing therethrough. The tubing of which the coil 63 is formed is hollow so that water may be passed therethrough to cool the tubing. The ends 69 of the tubing are connected to an external induction heating or current generating device which has not been shown in the present drawings but which is available commercially.

The induction heating mechanism, as is well known in the art, generates high frequency currents which are conducted through the tubing of the coil 63. The result of the high frequency alternating currents conducted through the coil 63 is that when an article which is a metallic conductor passes therethrough the article is heated due to eddy current losses. It is to be noted that in the present invention the article holders 38 are made of fibre and so are not heated by the eddy current losses.

A rod 71 also extends upwardly from the base 11 and has a support 72 fastened firmly near its upper end by means of an appropriate fastening device such as a screw 73. The support 72 has an opening therein through which passes an air pipe 74 which terminates in a nozzle 75, as may be seen in Fig. 1, which overlies the path of movement of the article holders 38. The air pipe 74 may be connected to any external suitable source, such as to the same air pressure generating unit to which the pipe 58 is connected.

The operation of the device is as follows: The motor 19 is started by any well known means, such as by throwing a motor switch (not shown), thereby causing movement to the belt 16 through the shaft 18 and the cone pulley 17, and thus imparting rotation to the four step cone pulley 14. Rotation of the pulley 14 results in the shaft 22 likewise being rotated and causes motion to be imparted through the gear reduction mechanism 12 to the shaft 23 extending upwardly therefrom. Rotation of the shaft 23, which as previously mentioned is an integral portion of the small circular plate 24, which in turn is connected securely to the turret 27, results in rotation of the latter. Thus, motion is imparted to the turret 27, in a clockwise direction as viewed in Fig. 3, which causes the spindles 32 to be passed successively through the field of the induction heating coil 63.

Simultaneously with the initiation of the motor 19, the induction heating mechanism for generating high frequency current through the tubing of the coil 63 is started into operation, thereby resulting in a field being set up between the parallel or arcuate sides of the coil.

Likewise, at this time the handle 60 of the valve 59 is so positioned as to allow air under pressure to enter from the external unit through the air hose 58, the valve 59, the coupling 56 and into the air pipe 52 from whence it is exhausted through the individual spaced openings 61 in the bottom thereof.

With the turret 27 rotating in a clockwise direction, an operator places articles within the work holder 38 and then places the work holders over the slotted end of the rods 33, causing the slotted upper end 36 to be forced inwardly and then outwardly under its natural resilience, thereby positioning securely the work holder 38 on the top of the rod 33. This operation occurs at some point prior to the spindles 32 reaching a point above the valve 59 (Fig. 3) so that the spindles 32 are loaded prior to their reaching the heating coil 63.

As the spindle 32 reaches a position approximately similar to that in Fig. 3 wherein the spindle is broken away and the fan 50 shown, air under pressure will issue from one of the openings 61 in the air pipe 52 and impinge with force against the blades of the fan 50. The force of the air impinging on the individual blades of the fan 50 will cause the fan to rotate, thereby imparting rotation to the collar 34 to which the fan 50 is connected. Inasmuch as the collar 34 is connected securely to the rod 33 by means of the set screw 35, the rod 33 will also rotate causing the article holder 38 positioned at the upper end thereof to rotate likewise. Once the spindle 32 is started into rotation it will continue to rotate as it is moved in a clockwise direction by means of the rotary movement of the turret 27, inasmuch as previously mentioned, the air pipe 52 has a plurality of spaced openings 61 in the underside thereof. As a matter of fact, as viewed in Fig. 3, after the fan 50 has started to rotate as just described it will continue to do so until such time as it passes over the point at which the bracket 53 holds the air pipe 52 in place near the cap 55. It is to be understood, of course, that after the fan 50 has passed over this position it will not immediately stop rotating but will continue to do so until such time as it expends its energy or until such time as the operator halts rotation by grasping the article holder 38 at the top thereof to take it off and remove the article therefrom. It is to be noted that the rotation of the fan 50, and thus the spindle 32, occurs during the time that the article holders are being passed through the field of the induction coil 63. As previously pointed out, by individually rotating the work as it passes through the field of the coil better heat distribution will result, or if soldering is being done, centrifugal action may be utilized to force the solder outwardly with respect to the articles being soldered. Such rotation is facilitated by means of the thrust bearings 48, as may be seen clearly in Fig. 2.

After the work holder passes completely through the induction coil 63, referring to Fig. 1, it will pass under the nozzle 75 connected to the air hose 74. The air being discharged through the nozzle is directed upon the articles in the holders 38, thus tending to cool the articles and dissipate the heat stored therein from their passage through the induction coil. It is to be noted that the article holder 38 is made of a material which will not take on any heat as it passes through the coil.

It is to be noted that each of the rods 33 is provided with a similar fan 50 at the bottom thereof to cause each of the rods 33 to rotate as the fan 50 passes under the air jets 61 in the air tube 52, or with respect to the turret 27 as it passes through the field of the coil 63. While a certain number of spindles 32 have been disclosed in the present drawings, it is obvious that the number may be altered depending on the size of the turret 27 and the nature of the work to be performed.

It is apparent that if it is necessary that a different type of operation be performed on the article to be passed through the coil a different type of article holder may be substituted for the present one shown.

From the above description it may be seen that the articles placed in the article holders 38 will be moved in a clockwise direction (Fig. 3) until such time as they come approximately above the bracket 53 shown in full lines (Fig. 3) at which position the articles and article holders will be rotated individually with respect to the turret 27 by means of the jets of air issuing from the openings 61 in the lower side of the air pipe 52. This individual rotation of the spindles 32 will continue as the turret 27 moves in a clockwise direction, moving the articles in the article holder 38 through the field of the induction heating coil 63. Such individual rotation will continue until such time as the spindles pass the bracket 53 closest to the cap 55 forming the end of the air pipe, at which time air pressure from the pipe 52 will no longer cause rotation of the spindles through the rotation of the fans 50. The spindles will continue to rotate, as previously mentioned, until their energy is expended or until the operator stops them. Thereafter, they will remain in a stationary position with respect to rotary motion until such time as they are once again advanced by means of the clockwise movement of the turret 27 to a position as initially described.

In the present embodiment the air pipe 52 has been shown as extending approximately 180° of the turret 27 and shaped arcuately. However, it is to be understood that this distance may be increased or decreased, it only being necessary that the spindles rotate during such time as the articles pass through the induction coil. Likewise, the shape may be changed.

Figure 4:
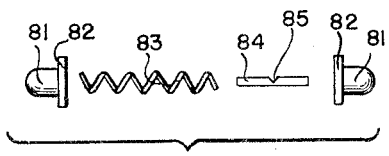
Fig. 4 is an exploded view showing an article which may be soldered by means of the apparatus embodying the present invention, including a representation of the solder used in the operation.

By referring to Fig. 4 there may be seen a specific example of an article soldered by the present apparatus. The article comprises a pair of hollow caps 81 having shoulders 82 at their forward end, and into each of which it is desired to solder the end of a spring 83. A piece of solder 84 having a notch 85 cut at the midpoint thereof may also be seen in Fig. 4.

In assembling the article for soldering the left end of the spring 83 is inserted in the left cap 81 and the piece of solder 84 is then placed within the spring 83. Thereafter the right end of the spring 83 is inserted in the right cap 81 and the caps 81 are forced toward each other, thus compressing the spring 83. The unit is then placed within a notch in the article holder 38, the shoulders 82 abutting walls of the article holder and preventing the spring from losing all its compression.

As the loaded article holder 38 passes through the coil 63 the solder will be heated to a point where it will be severed at the notch 85, and because of the rotation of the spindle and the article holder 38, centrifugal force will cause one-half of the solder to be forced into each cap 81. Thereafter, the solder will melt completely, but due to the centrifugal force will stay in the cap 81 in which it was forced, resulting in each end of the spring 83 being soldered to its respective cap 81. It is to be noted that the temperature at which the solder melts is not high enough to affect the spring or caps.

Figure 6:
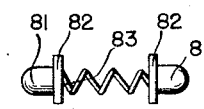
Fig. 6 shows the completed article after the component parts have been soldered together.
Figure 5:
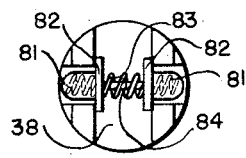
Fig. 5 shows the assembled article inserted in the article holder prior to soldering.

Fig. 6 shows the completed article after the spring has been soldered within the two caps.

Although a specific embodiment of the invention has been shown and described it will be understood that this embodiment is but illustrative, and that various modifications may be made therein without departing from the scope and spirit of this invention.

What is claimed is:

1. In induction heating apparatus, a coil for inductively heating articles, a turret, a plurality of article holding spindles on said turret, means for rotating said turret to successively pass said article holding spindles through said coil, a fan connected near the bottom of each of said spindles to cause rotation thereof, and a pipe overlying said fans but underlying said turret having air under pressure therein and having a plurality of spaced openings in the bottom thereof whereby air being forced through the openings in said pipe will impinge on said fans and cause rotation thereof and of said spindles associated therewith independently with respect to said turret.

2. In induction heating apparatus, a coil for inductively heating articles, a turret, a plurality of article holding spindles on said turret, means for rotating said turret to successively pass said article holding spindles through said coil, a fan connected near the bottom of each of said spindles to cause rotation thereof, and a pipe overlying said fans but underlying said turret having air under pressure therein and having a plurality of spaced openings in the bottom thereof whereby air being forced through the openings in said pipe will impinge on said fans and cause rotation thereof and of said spindles associated therewith independently with respect to said turret, said pipe being so positioned that said spindles are rotated as said turret causes them to be passed through said coil.

VOLNEY A. HUTCHINSON.

REFERENCES CITED

The following references are of record in the file of this patent:

UNITED STATES PATENTS

| Number | Name | Date |
|---|---|---|
| 1,833,417 | Drake | Nov. 24, 1931 |
| Re. 22,322 | Goodridge | May 25, 1943 |
| 931,663 | Wilbur | Aug. 17, 1909 |